United States Patent
Reichel et al.

(10) Patent No.: US 9,630,616 B2
(45) Date of Patent: Apr. 25, 2017

(54) METHOD FOR CONTROLLING AN AUTONOMOUS VEHICLE SYSTEM AND MOTOR VEHICLE

(71) Applicant: AUDI AG, Ingolstadt (DE)

(72) Inventors: Michael Reichel, Ingolstadt (DE);
Karl-Heinz Siedersberger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/422,958

(22) PCT Filed: Aug. 19, 2013

(86) PCT No.: PCT/EP2013/002496
§ 371 (c)(1),
(2) Date: Feb. 20, 2015

(87) PCT Pub. No.: WO2014/029492
PCT Pub. Date: Feb. 27, 2014

(65) Prior Publication Data
US 2015/0217763 A1    Aug. 6, 2015

(30) Foreign Application Priority Data
Aug. 23, 2012 (EP) .................... 10 2012 016 802

(51) Int. Cl.
*G01C 22/00* (2006.01)
*B60W 30/00* (2006.01)
(Continued)

(52) U.S. Cl.
CPC ........ *B60W 30/00* (2013.01); *B60W 50/0098* (2013.01); *B60W 50/08* (2013.01);
(Continued)

(58) Field of Classification Search
CPC ........ G05D 2201/0213; G05D 1/0214; G05D 1/0297; B60W 30/00
(Continued)

(56) References Cited

U.S. PATENT DOCUMENTS 8,849,494 B1 * 9/2014 Herbach ............... B60W 30/00
                                                          701/24
2005/0150701 A1   7/2005 Michi
(Continued)

FOREIGN PATENT DOCUMENTS

DE    198211634    11/1999
DE    10210547     9/2003
(Continued)

OTHER PUBLICATIONS

International Search Report issued by the European Patent Office in International Application PCT/EP2013/002496 on Aug. 19, 2013.

*Primary Examiner* — Gertrude Arthur Jeanglaud
(74) *Attorney, Agent, or Firm* — Henry M. Feiereisen LLC.

(57) ABSTRACT

A method for controlling a vehicle system, which is designed for autonomous operation of a motor vehicle is described, wherein setting information for the vehicle system is determined from location information describing a current position of the motor vehicle and from at least one location-related permission information item relating to the permission of use of the vehicle system, and at least one operating parameter of the vehicle system is selected as a function of the setting information.

12 Claims, 1 Drawing Sheet

(51) Int. Cl.
  *B60W 50/00* (2006.01)
  *B60W 50/08* (2012.01)
  *G01S 19/13* (2010.01)
  *B60W 30/06* (2006.01)
  *B60W 30/12* (2006.01)
  *B60W 30/16* (2012.01)
  *B60W 30/17* (2012.01)

(52) U.S. Cl.
  CPC ........... *B60W 50/085* (2013.01); *G01S 19/13* (2013.01); *B60W 30/06* (2013.01); *B60W 30/12* (2013.01); *B60W 30/16* (2013.01); *B60W 30/17* (2013.01); *B60W 2050/008* (2013.01); *B60W 2050/0078* (2013.01); *B60W 2420/42* (2013.01); *B60W 2550/402* (2013.01)

(58) Field of Classification Search
  USPC ......... 701/23, 408, 409, 418, 468, 484, 485, 701/300
  See application file for complete search history.

(56) References Cited

U.S. PATENT DOCUMENTS

| | | | |
|---|---|---|---|
| 2009/0140887 A1* | 6/2009 | Breed | ................. G01C 21/165 340/990 |
| 2011/0071701 A1 | 3/2011 | Holub | |
| 2011/0098922 A1 | 4/2011 | Ibrahim | |
| 2012/0303217 A1 | 11/2012 | Reichel et al. | |
| 2013/0058534 A1 | 3/2013 | Zobel | |
| 2013/0191003 A1 | 7/2013 | Hahne | |

FOREIGN PATENT DOCUMENTS

| | | |
|---|---|---|
| DE | 102007028756 | 12/2008 |
| DE | 102007046765 | 6/2009 |
| DE | 102010037467 | 3/2011 |
| DE | 102010042873 | 4/2011 |
| DE | 102010020330 | 11/2011 |
| DE | 102010028837 | 11/2011 |
| DE | 102011121442 | 6/2013 |

* cited by examiner

METHOD FOR CONTROLLING AN AUTONOMOUS VEHICLE SYSTEM AND MOTOR VEHICLE

CROSS-REFERENCES TO RELATED APPLICATIONS

This application is the U.S. National Stage of International Application No. PCT/EP2013/002496, filed Aug. 19, 2013, which designated the United States and has been published as International Publication No. WO 2014/029492 and which claims the priority of German Patent Application, Ser. No. 10 2012 016 802.0 filed Aug. 23, 2012, pursuant to 35 U.S.C. 119(a)-(d).

BACKGROUND OF THE INVENTION

The invention relates to a method for controlling a vehicle system configured for the autonomous operation of a motor vehicle, and to a motor vehicle.

Motor vehicle systems configured for autonomously operating a motor vehicle, often also referred to as autonomous driver assistance systems, where already proposed in the state-of-the-art for a broad range of purposes. A known group of systems for example involves automatic parking processes, in particular also an automatic search for a parking space. But also systems with an extended range of application have been proposed, however various approval processes have yet to be completed. Known and conventional are also semi-autonomous driver assist systems, for example those that perform steering interventions for staying within a lane or those that enable a longitudinal control, for example relative to a vehicle driving ahead (ACC-system). Finally so-called traffic jam assistants have been proposed, which are intended to partially or completely take over the control of the motor vehicle in a traffic jam, in particular also at low speeds.

As far as safety is concerned, autonomous vehicle systems are perceived rather critical. Therefore, at least for the time being, their use is limited to certain regions or traffic areas for example private properties. In order to at least partially use an autonomous vehicle system the actually driven on region (traffic area) has to be "dedicated" for the particular type of the piloted (autonomous) driving. Dedication means an act of public authority by virtue of which an object obtains a special status under public law. This dedication determines the public purpose (for example public use, here the use for autonomous driving) that the object has to serve. Different concepts for dedicating different regions of the agricultural traffic area (the total number of traffic routes usable for agricultural vehicles) have already been discussed. Conceivable are thus regions with special use rights, private property without dedication, private property with a dedication that determines the degree to which an existing law applies to the private property, public land and the like. Correspondingly it is also conceivable to authorize certain areas of the agricultural traffic area for certain types of autonomous driving.

Autonomous driver assist systems, i.e., vehicle systems of the aforementioned type that are configured for autonomous operation of the motor vehicle, are presently designed to possess certain basic parameters which are for example adjusted to left-hand traffic or right-hand traffic and to general functions and system limits, and which—like the operation of the vehicle system—can be adjusted by the user, in particular the driver of the motor vehicle. This means that within predetermined limits, it is presently the user himself who makes decisions regarding the operation of a vehicle system that enables autonomous driving, which thus may potentially lead to problems.

However, functions of autonomous driver assist systems are not only coupled to the dedication of areas but may also be coupled to other circumstances. Thus the use of functions may also depend on an infrastructure surrounding the motor vehicle, such as parking systems, or other, in particular neighboring, motor vehicles have to have a certain degree of automation themselves. The latter is for example required when a kind of "electronic drawbar" is to be realized while driving in a convoy and the like.

Thus user related or manufacture related misconfigurations may easily occur in vehicle systems that are configured for the autonomous operation of motor vehicles.

SUMMARY OF THE INVENTION

An object of the invention is therefore to enable an improved setting of operating parameters of a vehicle system that is configured for autonomous operation of a motor vehicle, which setting is adjusted to the environmental conditions at hand.

For solving this object it is provided in a method of the aforementioned type according to the invention that a setting information for the motor vehicle is determined from a positional information which describes the actual position of the motor vehicle and at least one item of authorization information regarding the permission of the use of the vehicle system, and at least one operating parameter of the vehicle system is selected as a function of the setting information.

The present invention thus proposes to entirely automatically determine the location of the motor vehicle, i.e., its actual position, and a location-dependent permission information, in particular in a control device of the motor vehicle. The permission information relates to the permission or possibility of the use of the vehicle system so that together with the actual location of the motor vehicle a setting information can automatically be deduced from which, for example via a look-up table, at least one associated operating parameter of the vehicle system can be deduced, which is correspondingly automatically set.

In this way the motor vehicle is thus able to recognize for example areas which are specifically authorized for the use of functions of the vehicle system and to configure itself correspondingly. For example it can be provided that a piloted garage parking is only possible on private properties on which the piloted parking is specifically permitted, i.e., a vehicle system can be configured so that it cannot be activated outside of such private properties. However beside the here exemplary described general activatability of functions of the vehicle system as operating parameters, more complex configuration processes are also conceivable.

Thus in a further example of a vehicle system which autonomously causes the motor vehicle to assume a safe state, it can be determined due to the permission information how the safe state is defined for the actual area and where the motor vehicle can be safely placed. An example is the stopping on a side strip, which is not authorized for the regular traffic. The vehicle system can then automatically be configured correspondingly by setting appropriate operating parameters to the required values.

Thus the permission information may not only be regarded as a general indication with regard to the permission of an autonomous driving operation or certain functions of the autonomous driver assist system, but in addition may also contain information regarding how a function, for example parking or assuming a safe state, is to be realized.

Further possible operating parameters which may be automatically set within the framework of the method according to the invention are system limits of the vehicle system, i.e., for example a maximal speed up to which an autonomous driving is permitted, an area in which an autonomous driving is permitted and threshold values regarding such parameters, for example driving dynamics parameters of the motor vehicle and the like. Depending on the situation it may be provided in this context that multiple automation levels or automation degrees are assigned to the vehicle system, of which at least one is selected in dependence on the permission information, for example as corresponding setting information, which can then be converted into or contain corresponding operating parameters as explained above.

It can be seen that the method according to the invention has the advantage to automatically determine information, i.e., the permission information so that a fully automatic and optimal setting of the vehicle system, which is configured for autonomous operation of the motor vehicle, is enabled that is within the legal and technical limits.

For fully automatically determining the permission information, multiple possibilities are conceivable which can also be combined, which means multiple items of permission information may be obtained from multiple sources. According to he invention essentially three possibilities are proposed which are explained in more detail in the following.

In a first embodiment of the present invention it is possible that at least one item of permission information is obtained as an attribute assigned to a map element of a digital map. Thus it is for example conceivable to add an attribute in the digital map material of a navigation system of the motor vehicle, which attribute represents for example the dedication of the corresponding map element, i.e., for example of a an area or contains the dedication in a more detailed itemized manner, i.e., an official permission for using certain autonomous functions. However, other types of maps are also conceivable for example areas that are defined entirely by the user himself, for example by way of GPS information, which can be assigned permission information as attribute. Also editing of a digital map of a navigation system by the user is conceivable.

It is also generally possible that the attribute is changed and/or inputted by the user at least in certain areas. This is particularly advantageous when the user himself wishes to manage certain authorizations himself, for example the use of an autonomous parking or standing function on a private property, for example an own property or a private property used by multiple persons, for example a parking garage or the like. Hereby a user interface inside the motor vehicle can be provided via which so to speak a personal dedication of areas is inputted, for example by marking on a map section or in a different manner.

To keep attributes in the digital map as up to date as possible, it can also be provided however that the attribute is updated at least in certain regions by a server. It is thus conceivable that the motor vehicle obtains regular actualizations for the digital map material via communication connections, for example the Internet, which also relate to the permission information stored as attribute, thus enabling for example a fast detection of changes of dedications.

In a second embodiment of the method according to the invention which is preferably used together with another embodiment, it can be provided that at least one item of permission information is determined from communication data received during a car-to-car communication. It is also conceivable that an item of information regarding the actual usability of functions of autonomous vehicle systems is obtained from a car-to-car communication (C2C). Hereby it can be provided in a preferred embodiment that the permission information is determined from communication data that relate to at least one operating parameter of at least one vehicle system of at least one other motor vehicle configured for autonomous operation of a motor vehicle. This means that conclusions can be drawn based on the use of functionalities of autonomous driver assist systems and the like by other motor vehicles regarding whether and in how far functions of the vehicle system of the own motor vehicle can be used. This can be ultimately utilized in two different ways.

On one hand it is conceivable to determine via such communication data the general use of functions that are not necessarily related to other motor vehicles. This means the fact that multiple, in particular the majority, of motor vehicles in the vicinity use autonomous functions, allows drawing the conclusion that this is also permissible and appropriate for the own motor vehicle. On the other hand the use of communication data can also mean that it is checked whether functions of the vehicle system can be realized. An example for this are vehicle systems, which ultimately depend on other motor vehicles using the vehicle systems, for example when implementing a so-called "electronic drawbar". For example driving in a tight convoy may only be possible when the motor vehicles driving ahead are technically configured for the electronic drawbar themselves. In another example a fully automatic driving in a traffic jam can be made dependent on how many other motor vehicles are driven and/or may be driven in a piloted, i.e., autonomous manner. The ability to communicate with other motor vehicles is also advantageously used in order to make the authorization of piloted functions dependent on the degree of automation in the vicinity of the own motor vehicle.

In the third embodiment, which also relates to the automatic determination of the positional information, it can be provided that at least one item of permission information and/or the positional information is determined from measurement data received by a sensor and/or a communication device of the motor vehicle. In this case sensor data or a communication device for communication with fixed senders (C2x-communication) are thus used to determine measuring data which describe the actual location of the motor vehicle and/or at least one item of permission information, wherein the positional information can here also be relative, which will be explained in more detail below.

Thus it can be advantageously provided that measuring data regarding a sign or marker, which relates to the permission of the use of the vehicle system, are obtained via at least one optical sensor, in particular a camera, and are analyzed for determining the permission information and/or the positional information. When for example optically marking certain areas, which are suitable or permissible for the use of functions of the motor vehicle system that permits the autonomous operation of the motor vehicle, be it by defined makers or signs, these makers or signs can be detected by an optical sensor in the motor vehicle. For example image analysis can be used in order to determine markers and/or signs in data of a camera as optical sensor, similar to a traffic sign recognition. For example it is possible to provide corresponding markers and/or signs upon entering such an area as wells as exiting from such an area, so that in particular the known optic of the optical sensor enables concluding when the motor vehicle reaches this area and when it is located in the area, thus a (relative) positional information can be determined as actual position.

As an alternative or in addition it can be provided that the permission information and/or the positional information is determined from measuring data received by a radio sender, in particular a transponder. Hereby instead of the optical markers and/or signs, it is conceivable on one hand to also use radio-based field markers or makers, which for example are capable of actively transmitting signals which are received and analyzed by the communication device of the motor vehicle, for example regarding the relative position of the radio transmitter and preferably an informational content of the signals as permission information transmitted concomitantly. Received items of permission information can be of different types, for example they can concretely indicate which functions of a vehicle system are permitted or the like, or also merely generally the use of autonomous functions in motor vehicles.

It is also noted that it is also possible of course within the scope of the method according to the invention to determine the positional information via a GPS sensor. Also the use of a differential GPS is conceivable.

In a further advantageous embodiment of the present invention it can be provided that the operating parameters describe a range of functions of the vehicle system, in particular at least one range of functions, which describes the system limits. As explained before, it is conceivable in a first abstraction of the method according to the invention to regulate its general usability via the permission information and the correspondingly resulting operating parameters, however as mentioned before it is also conceivable, to perform finer subdivisions up to a concrete parameterizing of functions and a concrete definition of system limits. Depending on the accuracy of the permission information, it is also possible to establish multiple levels of detail within the framework of the present invention, in particular as already explained, different degrees of automation and the like.

A special system limit for vehicle systems enabling autonomous operation of the motor vehicle is the departure from the space in which a defined function which was permitted is currently active, but is no longer permitted at an actual position. In a preferred refinement of the invention it can be provided in this context that when transitioning from a region with an item of permission information which describes a higher degree of automation to a region with a permission information which describes a lower degree of automation, at least one item of information, in particular a request to take over driving, is outputted to the driver, and/or the motor vehicle is automatically caused to assume a safe state, in particular a standstill. Thus when the permitted degree of automation ends, the method according to the invention can also provide a downgrading strategy, which leads to a safe state. In particular scenarios are conceivable in which the driver is not "in the loop" so that he can be alerted by a request to take over driving that he has to at least partially take over driving activities again. In a concrete embodiment it can be provide for example that after the request to take over driving, a defined period of time is permitted to elapse until the driver takes over, wherein after the time period has elapsed the vehicle is caused to assume a safe state, in particular the standstill in order to thereby guarantee the greatest possible safety. It is noted that also in this case it can of course be distinguished between different situations in which different plans of action are used regarding the information of the driver and the causing of a safe state.

Beside the method, the present invention also relates to a motor vehicle which incudes a vehicle system configured for autonomous operation of the motor vehicle. The motor vehicle, in particular concretely a control device of the vehicle system, is configured for implementing the method according to the invention, in particular also for automatically determining the actual location and the permission information, for automatically deducing the setting information and for the automatic setting of the operating parameters. For determining the positional information and the setting information for example appropriate sensors, a navigation system, a communication device and/or other vehicle systems can be accessed, or respectively given corresponding tasks which can be implemented via a bus system of the motor vehicle. All embodiments regarding the method according to the invention can be analogously applied to the motor vehicle according to the invention with which thus the advantages of the present invention can be obtained.

BRIEF DESCRIPTION OF THE DRAWING

Further advantages and details of the present invention will become apparent from the exemplary embodiments described in the following and by way of the drawing. It is shown in.

DETAILED DESCRIPTION OF PREFERRED EMBODIMENTS

Figure 1:
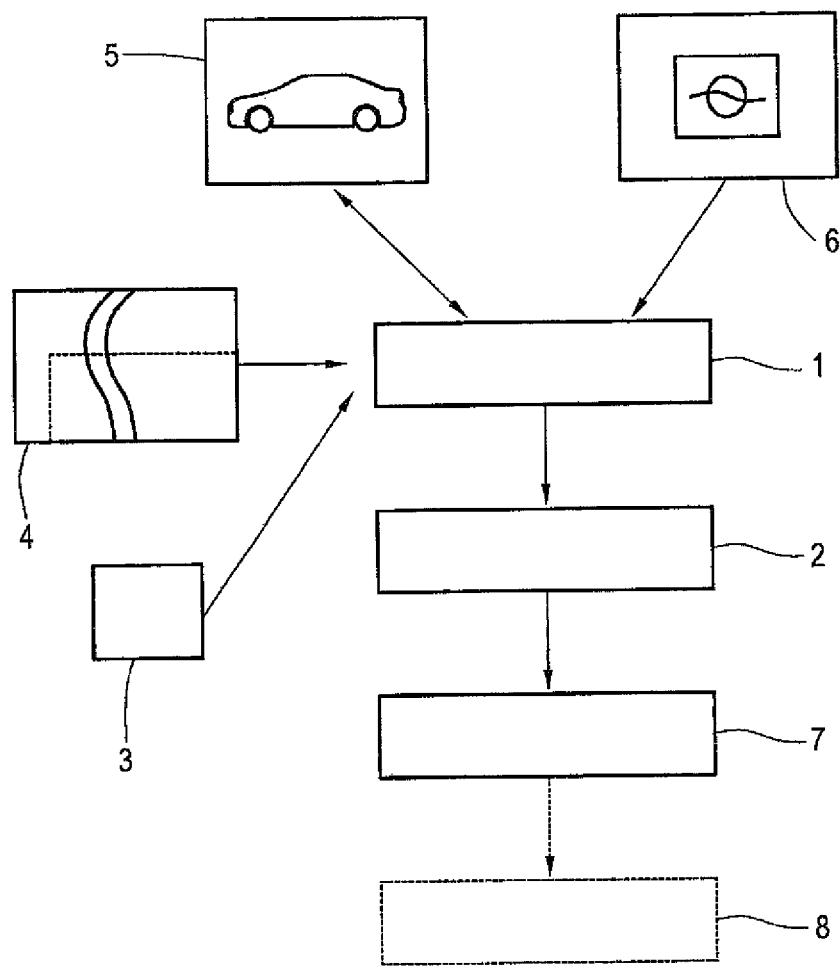
FIG. 1 a flow chart of the method according to the invention.

FIG. 1 shows a flow chart of an embodiment of the method according to the invention. The method is automatically carried out by a control device of a vehicle system that is configured for autonomous operation of a motor vehicle, in the case of the determination of data by measurement by corresponding control or query of the respective sensor or the respective communication device.

The shown method serves for parameterizing the vehicle system regarding circumstances in the environment of the motor vehicle, which relate to the permission or usability of functions of the vehicle system, in particular a dedication of a traffic space/or other permission for using autonomous functions and/or in particular in the case of cooperative functions the presence of an appropriate number of other motor vehicles which also have an appropriate degree of automation.

In a step 1 of the method, an item of information describing the actual position of the motor vehicle and an item of permission information describing the permission of the use of the vehicle system are determined, wherein the latter can be processed in a later step 2 to a setting information for the vehicle system, depended on the location, i.e., together with the positional information.

In this regard of course multiple items of positional information can be taken into account; in any case it is advantageous to gather and correspondingly process multiple items of permission information. Different methods to determine items of positional and permission information are schematically shown in FIG. 1.

Thus it is for example possible on one hand, and also conventional in many motor vehicles, to determine an actual position of the motor vehicle, i.e., an item of positional information via a GPS sensor 3.

A first source of an item of permission information is the digital map 4, which may for example be stored in a navigation system of the motor vehicle. In the digital map 4 different attributes are assigned to map elements, i.e., certain spatial areas. One of these attributes is at least one item of permission information, which can be queried correspondingly by the control device of the motor vehicle.

Such attributes that represent items of permission information can be defined or assigned to map elements by a user himself. For this a corresponding user interface is provided via which for example a private property, on which autonomous driving is permissible or even desired, can be marked in correspondence with the functions permissible at this location, for example "automatic parking". Thus also private, not universally valid areas, which in contrast to the dedication and the like are not included in universally valid map products, can be added to the digital map 4. It is noted that in order to maintain universally valid spatial areas which are usable for every driver, and in which autonomous functions are permissible, up to date the digital map 4 is in communication with a server via a communication connection, for example the internet, and obtains updates from the server in regular intervals also regarding the attributes which contain permission information.

The navigation system—as is the case for other vehicle systems—can of course also be used in order to refine the positional information, for example associate the motor vehicle with a defined road or a road section, as it is generally known in the state of the art. A lane assignment on the road for example a highway, can be determined by using environmental data or further vehicle systems using these environmental data, for example lane keep assistants or lane change assistant systems. Thus the positional information can be determined with any desired accuracy so that in particular also permissibilities, i.e., items of permission information, can be used which relate to particular lanes, for example particularly driving lanes dedicated to the autonomous operation of motor vehicles.

It is also noted that a user-defined digital map 4 or the like can also be used.

A further source of information are communication data an measurement data which are determined via a car to car communication device or generally also via a communication device 5 which is configured for other types of communication. Communication data of a car-to-car communication allow drawing conclusions regarding the degree of automation in motor vehicles that are located in the same area as the own motor vehicle. On one hand general conclusions regarding the usability of functions of the vehicle system for autonomous operation of the motor vehicle as permission information can be drawn; in particular however communication data of the car-to-car communication are useful when autonomous functions are given which in their entirety or regarding their functional range depend on the degree of automation of the environment. Thus a tight convoy with an electronic drawbar is for example only possible when vehicles driving ahead also have a corresponding autonomous function; also the function of autonomous traffic jam pilots can be adjusted depending on how many motor vehicles in closer vicinity also have a traffic jam pilot and the like.

A communication device 5 can however also be used for the car-to-X communication (C2X communication) or for receiving radio signals, which may contain items of permission information and positional information. Thus it is conceivable for areas in which defined autonomous functions are permitted to install transponders, which transmit these items of information. At the same time it is conceivable to determine from the received radio signals a position of the motor vehicle relative to the transponders so that then when determining the individual items of information conclusions can be drawn whether the motor vehicle is located in the relevant area. In this regard different possibilities are conceivable to set the degree of detail of the permission information contained in the radio signal.

Such an installation of transponders is for example advantageous in private areas such as parking garages or parking lots in which defined areas are authorized for autonomous driving functions.

A further data source for items of permission information are measuring data, in particular optical measuring data 6. Hereby an optical sensor, in particular a camera can be used in order to record markers (land marks) and/or signs which indicate permitted autonomous operation, for example defined symbols which can be detected within the framework of image processing. A recognition in the sense of a traffic sign recognition of corresponding signs is also possible. The knowledge regarding the orientation of the optical sensor further enables determining the or a (relevant) positional information, which as the case may be can also be "continued" by the driving dynamics data of the motor vehicle to determine whether the motor vehicle enters the marked area or in the case of a marker or sign that indicates an end of a marked area, whether it leaves this area again.

As can be seen, different variants are conceivable in order to automatically obtain the items of permission information, wherein particularly advantageously at least one of the sources of information 4 and 6 is used together with communication data of the car-to-car communication, in order to cover all aspects, i.e., on one hand the "dedication" of a traffic space in the general sense, on the other hand however also the degree of automation of motor vehicles in the vicinity of the own motor vehicle.

Assigned to the setting information determined in step 2 are now sets of operating parameters for different values of the setting information, which operating parameters relate to the available functionality of the vehicle system configured for the autonomous operation of the motor vehicle. While the operating parameters can determined the general activatability of autonomous functions, they preferably also relate to the functional range, in particular system limits, which means a subdivision into different degrees of automation is possible which can be selected corresponding to the permission information and the positional information. For determining operating parameters in dependence on the setting information, i.e., in dependence on the positional information and the permission information, for example a look-up table or another dependency can be provided in order to determine appropriate operating parameters from a memory unit.

In a step 7 the vehicle system, which is configured for autonomous operation of the motor vehicle, is then correspondingly set.

The steps 1, 2 and 7 are repeated continuously, i.e., in regular intervals in order to thereby constantly automatically enable a setting of the autonomous operation of vehicle system configured for the autonomous operation of the motor vehicle that is adjusted to the environment of the motor vehicle.

The method according to the invention also offers another possibility, which is indicated in FIG. 1 by the optional step 8. Thus when it is determined that the motor vehicle is about to leave the area in which a higher degree of automation was permissible, to enter an area in which only a lower degree of automation is possible, corresponding measures that increase the safety of the motor vehicle can be provided. This can depend on the manner in which the areas differ from each other. Thus depending on the differences regarding the setting information or the permission information it is also conceivable to take different measures to further ensure the safety of the motor vehicle, in particular to provide a defined plan of action.

According to one example, when departing an area of complete autonomous operation of the motor vehicle, a request to take over driving is initially outputted to the driver, whereupon the driver is given a defined time period to at least partially take over driving functions again. When this does not occur it can be provided that the motor vehicle is caused to assume a safe state, in particular a standstill, wherein also in this case different variants are conceivable which for example may be described by an item of permission information, for example the possibility of placing the motor vehicle on a side lane.

Figure 2:
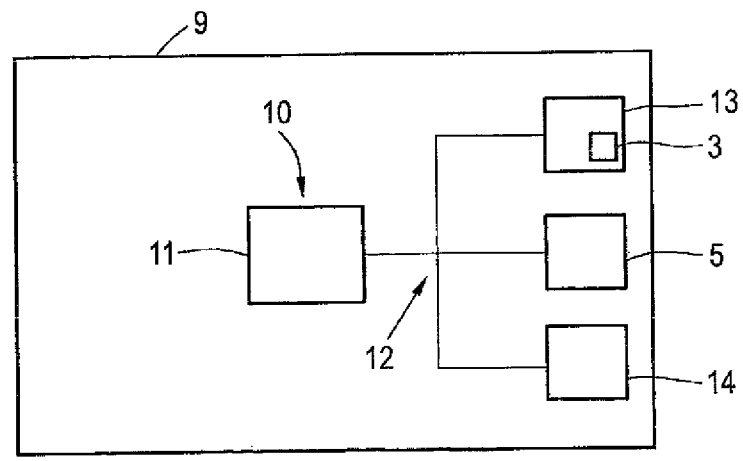
FIG. 2 a motor vehicle according to the invention.

FIG. 2 shows a schematic diagram of a motor vehicle 9 according to the invention. The latter has the vehicle system 10 configured for the autonomous operation of the motor vehicle 9, which vehicle system beside an appropriate access to actors and sensors also has a control device 1 in which the method according to the invention is automatically carried out. Via a bus system 12 the control device 11 is connected with further vehicle systems, wherein here a navigation system 13 with the GPS sensor 3, the communication device 5 and a camera 14 are only shown schematically. Of course as mentioned before, usually multiple such other further vehicle systems and sensors are provided which provided useful input data via the bus system 12, for example a CAN Bus, for the autonomous functions but also the method according to the invention.

What is claimed is:

1. A method for controlling a vehicle system configured for autonomous operation of a motor vehicle, comprising:
    determining a setting information for the vehicle system from an item of positional information which describes an actual position of the motor vehicle and from one or more position-related items of permission information which describe a permission of a use of the vehicle system; and
    selecting at least one operating parameter of the vehicle system as a function of the setting information,
    wherein at least one of one or more items of permission information is determined from communication data received in a car-to-car communication, said communication data relating to at least one operating parameter of at least one vehicle system configured for autonomous operation of a motor vehicle of at least one other motor vehicle, and
    wherein the at least one or more items of permission information and the positional information are determined exclusively in the motor vehicle from measuring data and/or position information received by a sensor and/or communication device of the motor vehicle.

2. The method of claim 1, wherein at least one of the one or more items of permission information is an attribute assigned to a map element of a digital map.

3. The method of claim 2, wherein the attribute is changed and/or inputted at least in areas by a user and/or is updated by a server.

4. The method of claim 1, further comprising recording measuring data relating to a sign or marker regarding a permission of using the vehicle system, and analyzing the recorded measuring data for determining the one or more items of permission information and/or the positional information.

5. The method of claim 1, wherein the one or more items of permission information and/or the positional information are determined from measuring data received from a radio transmitter.

6. The method of claim 1, wherein the positional information is determined via a GPS sensor.

7. The method of claim 1, wherein operating parameters describe a functional range of the vehicle system, said functional range being adjusted to the permission information.

8. The method of claim 7, wherein the functional range describes system limits of the vehicle system.

9. The method of claim 8, further comprising outputting at least one item of information to a driver and/or causing the motor vehicle to automatically assume a safe state when transitioning from a region with a permission information describing a higher degree of automation compared to a region with a permission information describing a lower degree of automation.

10. The method of claim 9, wherein the at least one item of information is a request to the driver to take over driving.

11. The method of claim 9, wherein the safe state is a standstill of the motor vehicle.

12. A motor vehicle, comprising
    a vehicle system configured for autonomous operation of the motor vehicle; and
    a control device determining a setting information for the vehicle system from an item of positional information which describes an actual position of the motor vehicle and from one or more position-related items of permission information which describe a permission of a use of the vehicle system, and selecting at least one operating parameter of the vehicle system as a function of the setting information,
    wherein at least one of one or more items of permission information is determined from communication data received in a car-to-car communication and relating to at least one operating parameter of at least one vehicle system configured for autonomous operation of a motor vehicle of at least one other motor vehicle, and
    wherein the at least one or more items of permission information and the positional information are determined exclusively in the motor vehicle from measuring data and/or position information received by a sensor and/or communication device of the motor vehicle.

* * * * *

UNITED STATES PATENT AND TRADEMARK OFFICE
CERTIFICATE OF CORRECTION

PATENT NO.       : 9,630,616 B2
APPLICATION NO.  : 14/422958
DATED            : April 25, 2017
INVENTOR(S)      : Michael Reichel and Karl-Heinz Siedersberger Page 1 of 1

It is certified that error appears in the above-identified patent and that said Letters Patent is hereby corrected as shown below:

On the Title Page

In Column 1, under (30): please replace "(EP) 10 2012 016 802" with --(DE) 10 2012 016 802--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*